United States Patent [19]
Okushita

[11] Patent Number: 5,696,753
[45] Date of Patent: Dec. 9, 1997

[54] OPTICAL PICKUP FEEDING APPARATUS

[75] Inventor: Kazuya Okushita, Chiba, Japan

[73] Assignee: Sony Corporation, Tokyo, Japan

[21] Appl. No.: 791,535

[22] Filed: Jan. 31, 1997

Related U.S. Application Data

[63] Continuation of Ser. No. 440,319, May 12, 1995, abandoned.

[30] Foreign Application Priority Data

May 24, 1994 [JP] Japan .................... 6-133677

[51] Int. Cl.⁶ .................... G11B 17/30; G11B 21/02; G11B 21/16
[52] U.S. Cl. .................... 369/219; 369/220; 369/244
[58] Field of Search .................... 369/215, 219, 369/220, 244, 249, 258, 263

[56] References Cited

U.S. PATENT DOCUMENTS 5,119,362  6/1992  Yanagisawa .................... 369/215

FOREIGN PATENT DOCUMENTS

| | | | |
|---|---|---|---|
| 61-29465 | 2/1986 | Japan | 369/215 |
| 2-64971 | 3/1990 | Japan | 369/215 |
| 2-83867 | 3/1990 | Japan | 369/215 |
| 4-111266 | 4/1992 | Japan | 369/215 |

*Primary Examiner*—Robert S. Tupper
*Assistant Examiner*—William J. Klimowicz
*Attorney, Agent, or Firm*—Jay H. Maioli

[57] ABSTRACT

An optical pickup feeding apparatus which eliminates the reference axis and compressed coil spring or the reference axis and parts such as as used heretofore or the reference axis and parts such as fixing parts as used heretofore and moreover has improved assembling efficiency.

The optical pickup feeding apparatus comprises a base portion 12 on which a groove 30 is formed to feed the optical pickup 10 in the radial direction of a disk D, a base member 40 of the optical pickup 10 having a guide projection 100 to be guided sliding along the groove 30 and a holding member 42 for holding the base member 40 of the optical pickup 10 movable in the radial direction of disk D with respect to the base portions 12 and including a plurality of biasing springs 60 for generating a component of force Fay in a first direction to press the guide projection 100 of the base member 40 of optical pickup 10 toward the groove 30 of the base portion 12 along the sliding direction and a component of force in a second direction orthogonally crossing the force in the first direction.

7 Claims, 9 Drawing Sheets

OPTICAL PICKUP FEEDING APPARATUS

This is a continuation of application Ser. No. 08/440,319 filed May 12, 1995, now abandoned

BACKGROUND OF THE INVENTION

1. Field of the Invention

The present invention relates to an optical pickup feeding apparatus for feeding, in the radial direction, an optical pickup which is used to record or reproduce information to or from a medium such as an optical disk, etc.

2. Description of the Prior Art

Figure 12:
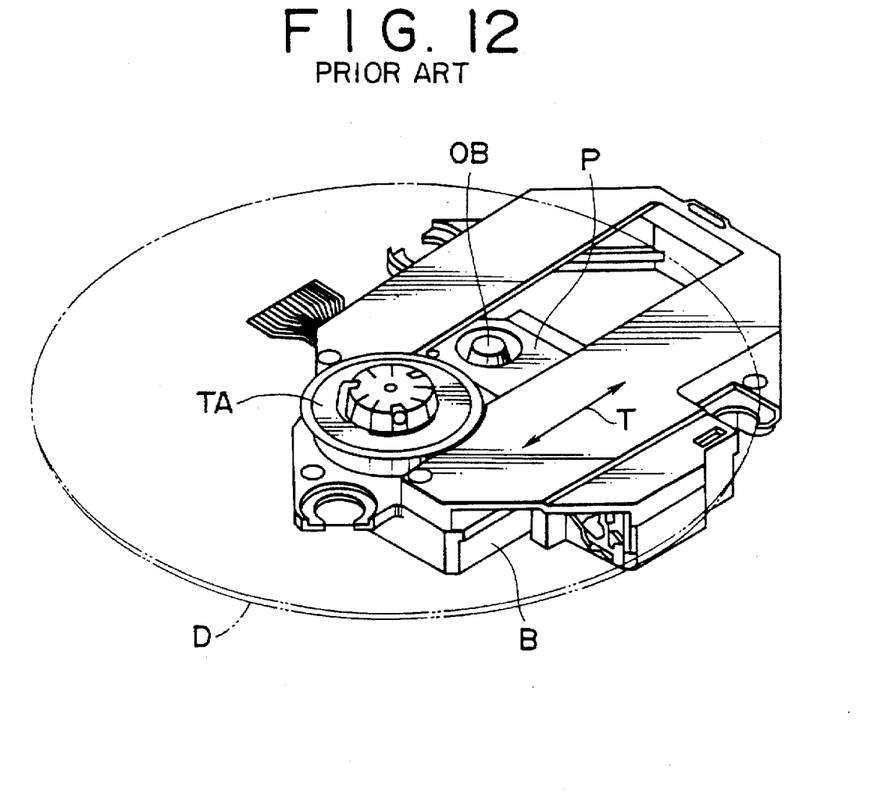
FIG. 12 is a perspective view indicating an optical pickup and base portion of the prior art.

An example of the conventional optical pickup and feeding apparatus is shown in FIG. 12. An optical pickup P of this type is designed to be capable of moving in the direction of arrow T (radial direction of an optical disk D) with respect to a base portion B. The base portion B is provided with a turntable TA for removably mounting an optical disk D such as a magneto-optical disk. An optical disk D is held, for example, by a loading surface of the turntable TA and three steel balls for the fixing purpose. These steel balls are biased toward the external direction with an O-ring provided on the inside. An optical disk D is fixed with such a spring force.

An optical pickup P is mounted on the base portion B to move along the radial direction T of a disk and can be driven the distance direction (focus direction) and radial direction (tracking direction) with respect to an optical disk D so that an objective lens OB can follow the pits of the optical disk D.

Figure 13:
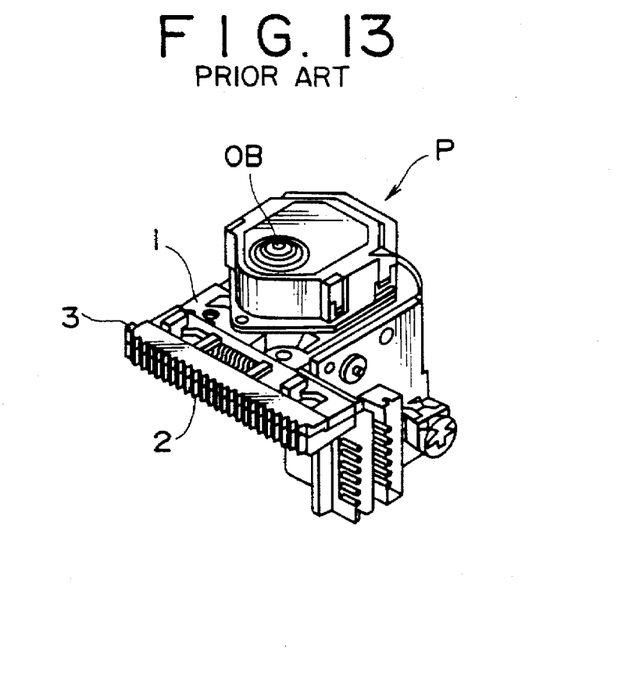
FIG. 13 is a perspective view indicating the optical pickup of the prior art shown in FIG. 12.

FIG. 13 illustrates an optical pickup P shown in FIG. 12. A main rack 2 is formed on the base 1 of the optical pickup P and a slide rack (subrack) 3 is also loaded to the base 1 through a compressed coil spring.

Figure 14:
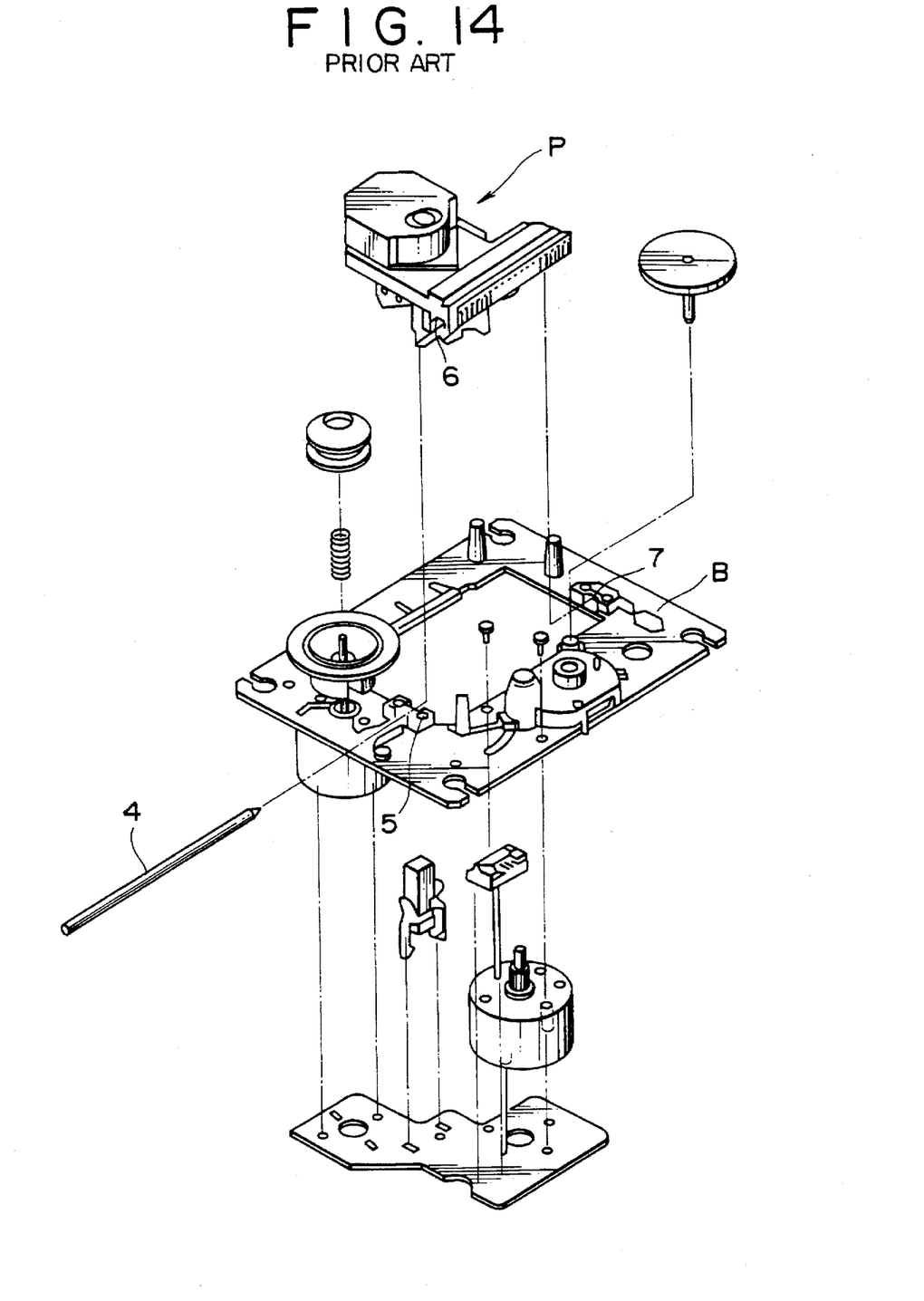
FIG. 14 is a diagram indicating an example of setting the optical pickup of the prior art using the reference axis.

As shown in FIG. 14, after the optical pickup P is held in the predetermined position of the chassis B called the base portion, a reference axis 4 is applied from the side surface of the chassis B through the fixing portion 5 and thereafter it is also applied to the other axis fixing portion 7 through the reference hole 6 of the optical pickup P. As explained above, the reference axis 4 is applied to the axis fixing portions 5 and 7. Application of such reference axis is described in the U.S. Pat. No. 5119362.

In the case of applying the reference axis 4 to the axis fixing portions 5, 7 as explained above, the reference axis 4 must be inserted rather tightly into the axis fixing portions in order to tightly fix the reference axis 4 with respect to the axis fixing portions 5, 7. Therefore, this application has a disadvantage of bad working efficiency.

Figure 15:
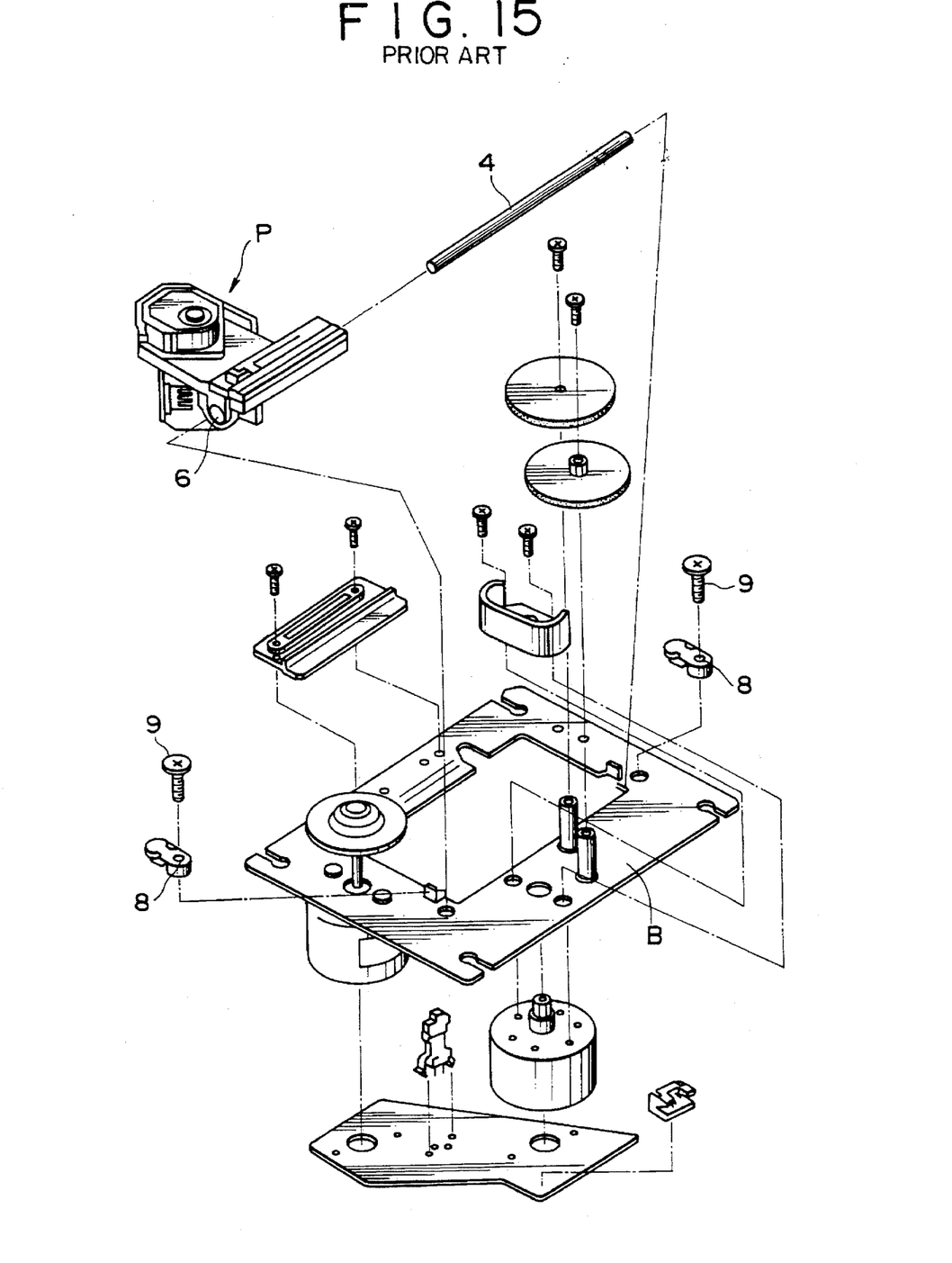
FIG. 15 is a perspective view indicating another example of setting the optical pickup of the prior art using the reference axis.

In another related art shown in FIG. 15, after the reference axis 4 is applied to the hole 6 of the optical pickup P, both ends of the reference axis 4 are fixed with the fixing parts 8, 9. Such application of the reference axis is disclosed in the Japanese Patent Laid-Open No. 64-24568 (Laid-open Date: Feb. 9, 1989). This related art shown in FIG. 15 also has a disadvantage that the working efficiency is bad because the reference axis 4 is fixed and moreover many parts are required.

SUMMARY OF THE INVENTION

The present invention has been proposed to eliminate such disadvantages or problems and it is therefore an object of the present invention to provide an optical pickup feeding apparatus which eliminates the reference axis and compressed coil spring which have been used in the related art or the reference axis and parts such as fixing parts and moreover has improved assembling efficiency.

The above-mentioned object of the present invention can be achieved by an optical pickup feeding apparatus for feeding the optical pickup in the radial direction of a disk with respect to the base portion to record or reproduce information to or from the disk, comprising the base portion having a groove formed thereon for moving the optical pickup in the radial direction of the disk, a base member of the optical pickup comprising a guide projection to be guided sliding along the groove and a holding member for movably holding the base member of the optical pickup in the radial direction of the disk with respect to the base portion comprising a plurality of biasing means for generating a component of force in the first direction to press the guide projection of the base member of the optical pickup to the groove of the base portion along the sliding direction and a component of force in the second direction orthogonally crossing the component of force in the first direction.

In the present invention, a rack is preferably provided on the base member of the optical pickup and another rack is also provided on the holding member.

One end of the biasing means of the present invention is preferably pressed toward a ramp area formed near the guide projection of the base member.

The rack of the base member of the optical pickup and the rack of the holding member, in the present invention, are preferably engaged with a pinion of the drive means for feeding the optical pickup.

According to the abovementioned structure of the present invention, a plurality of biasing means of the holding member generate a component of force in the first direction for pressing the guide projection of the base member of the optical pickup toward the groove of the base portion along the sliding direction and a component of force in the second direction. Thereby, the guide projection of the base member of optical pickup can be stably held and biased with respect to the guide of base portion with the component of force in the first direction and the guide projection of the base member can be guided along the groove.

Moreover, when a rack is provided on the base member of optical pickup and another rack is provided also on the holding member, a backlash is provided between the rack of base member and a gear engaged with the rack with the component of force in the second direction.

A moment generated due to deviation of the center of gravity of the optical pickup can be reduced by adjusting the component of force in the first direction and the component of force in the second direction of each biasing means.

DESCRIPTION OF THE PREFERRED EMBODIMENTS

The preferred embodiments of the present invention will be explained in detail hereunder with reference to the accompanying drawings. Embodiments explained hereunder are preferred embodiments of the present invention with various preferred technical limitations. However, the scope of the present invention is not limited thereto without description about particular limitations.

Figure 1:
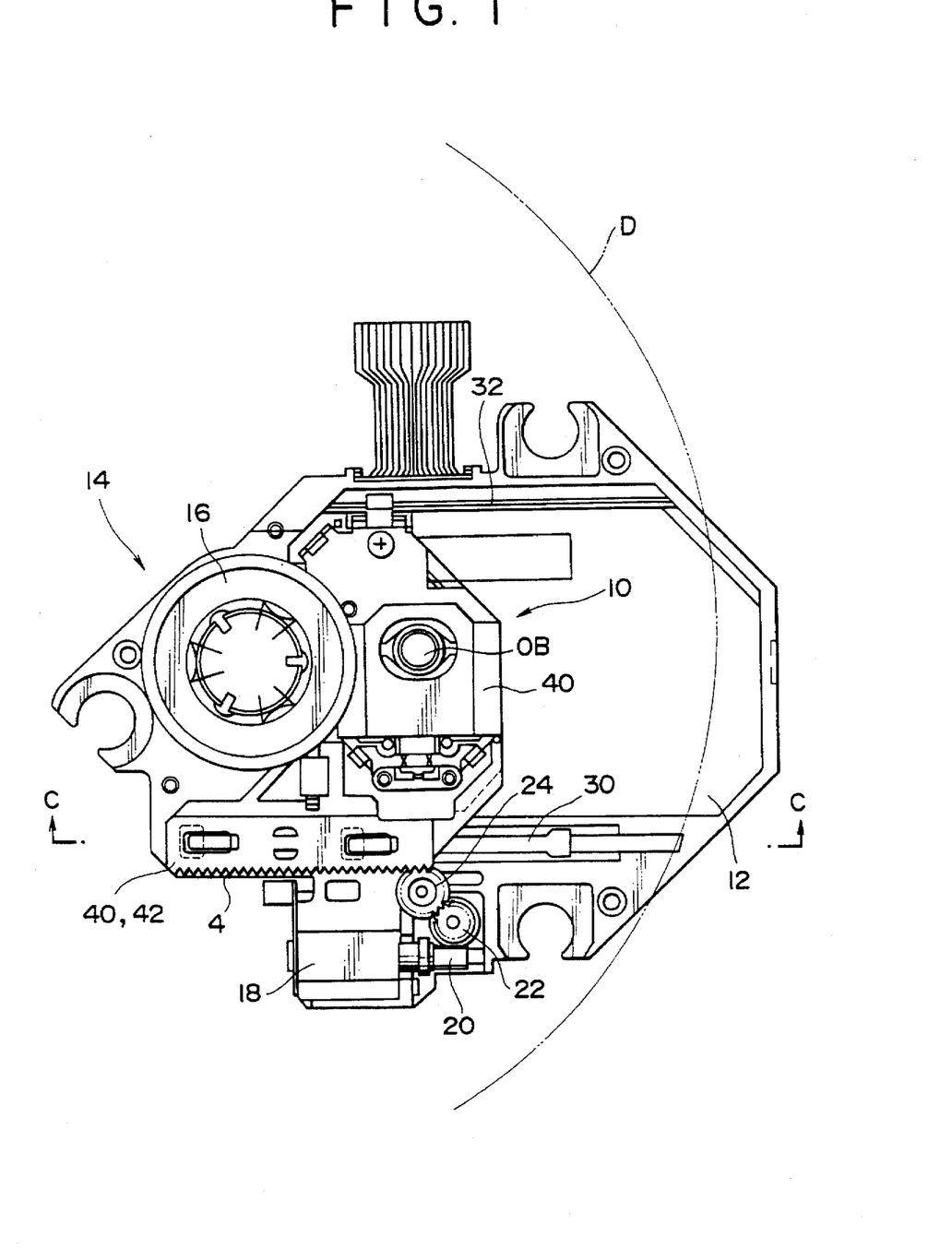
FIG. 1 is a plan view illustrating an optical pickup and an optical pickup feeding apparatus of the present invention.
Figure 2:
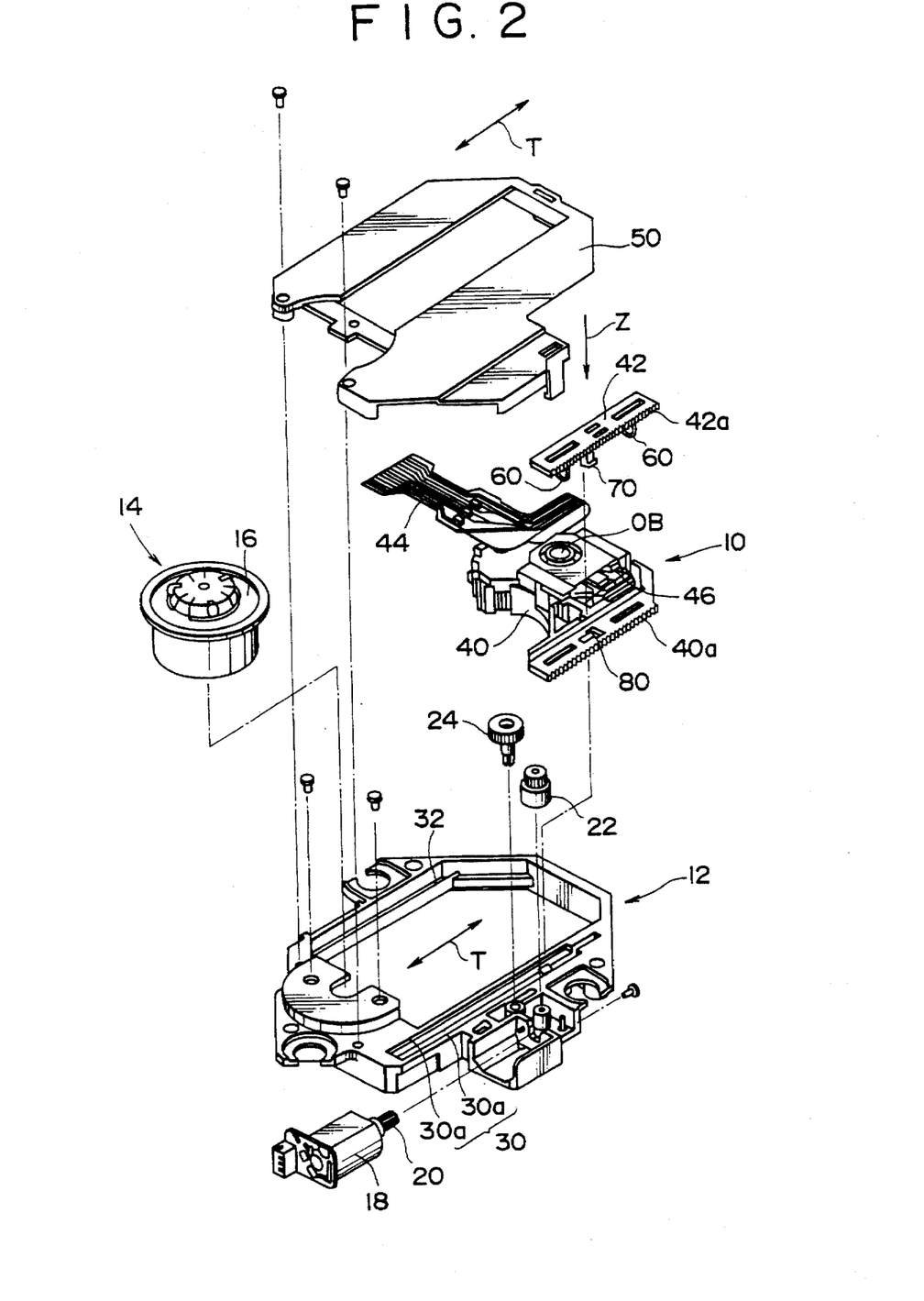
FIG. 2 is a perspective view of the disassembled optical pickup and optical pickup feeding apparatus of FIG. 1.

FIG. 1 is a plan view indicating an optical pickup 10 and a chassis 12 as a base portion in the present invention. FIG. 2 is a perspective view of the disassembled optical pickup 10 and chassis 12, etc. shown in FIG. 1.

The optical pickup 10 and chassis 12 will be explained in detail with reference to FIG. 1 and FIG. 2.

The chassis 12 is also provided with a spindle motor assembly 14. An optical disk D such as a magneto-optical disk shown in FIG. 1 can be unloadably loaded on a turntable 16 of the spindle motor assembly 14. The turntable 16 can be rotated with a motor.

The chassis 12 also allows mounting of a DC motor 18. A worm 20 of this DC motor 18 is engaged with a worm wheel 22 which is engaged with an idler gear 24.

The chassis 12 which is called an MD chassis also permits formation of a V-groove rail 30 in parallel with the direction indicated by the arrow T. Moreover, a guide groove 32 is also formed on the chassis 12. The V-groove rail 30 and the guide rail 32 are formed in parallel with each other. The inside of the chassis 12 is hollowed and an optical pickup 10 is movably arranged in this hollowed area.

The optical pickup 10 will be then explained in detail. The optical pickup 10 comprises a base member 40 thereof, a holding member 42, a flexible printed circuit board 44, an objective lens OB and a double-axis actuator 46, etc.

The double-axis actuator 46 is arranged on the base member 40 to drive the objective lens OB to move in the distance direction (focus direction) and radial direction (tracking direction) with respect to the optical disk D so that the objective lens OB can follow the pits, for example, of the optical disk D.

The flexible printed circuit board 44 is used for supplying power to the double-axis actuator 46 and a laser source, etc. provided in the optical pickup 10. Moreover, this flexible printed circuit board 44 transmits a signal to the main unit side (during reproducing operation) depending on the light beam returning from the optical disk D obtained through the objective lens OB and supplies the power source, during the recording operation, to the laser source depending on a control signal from the main unit side in order to drive the laser source.

A base rack 40a is formed on the base member 40 of the optical pickup 10 and a slide rack 42a on the holding member 42 of the optical pickup 10. This base rack 40a and slide rack 42a are formed in the same pitch.

As will be explained later, the base member 40 and holding member 42 are integrated as a unit and are then arranged in the hollow part of the chassis 12 and covered with a cover 50.

Next, coupling of the base member 40 of the optical pickup 10 which is also called the slide base and the holding member 42 and the mechanism for guiding the base member 40 along the V-groove rail 30 of the chassis 12 will now be explained with reference to FIG. 3 to FIG. 5.

Figure 3:
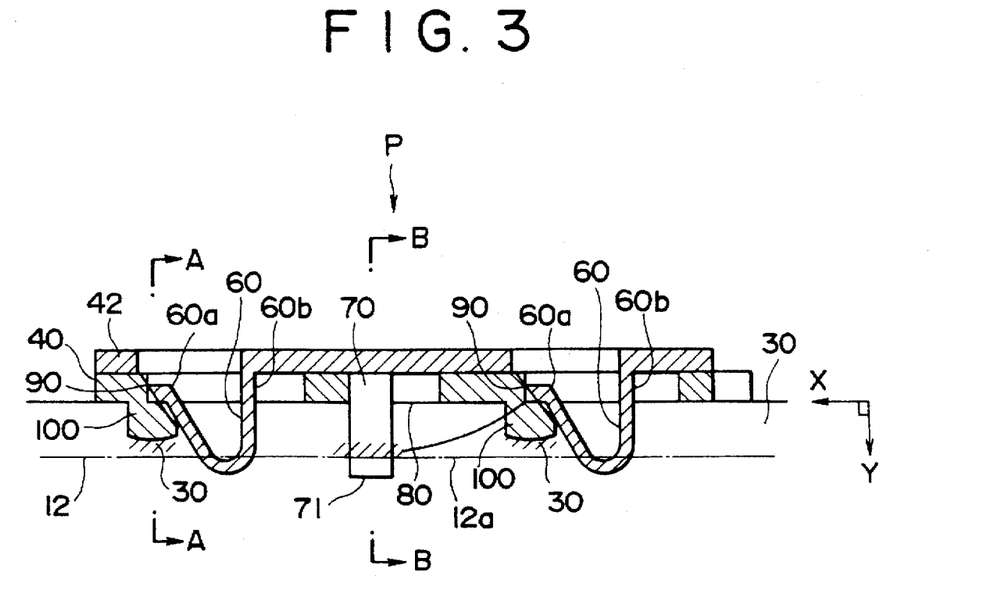
FIG. 3 is a cross-sectional view of FIG. 2 cut along the line C—C.

The cross-sectional view of FIG. 3 illustrates the holding member 42 and base member 40 and related portions of the chassis 12 which can be seen along the cut line C—C of FIG. 1.

Figure 4:
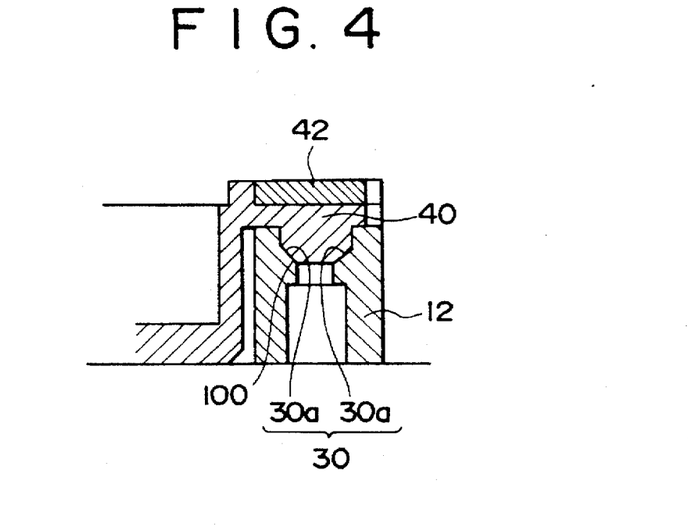
FIG. 4 is a cross-sectional view of FIG. 3 cut along the line A—A.
Figure 5:
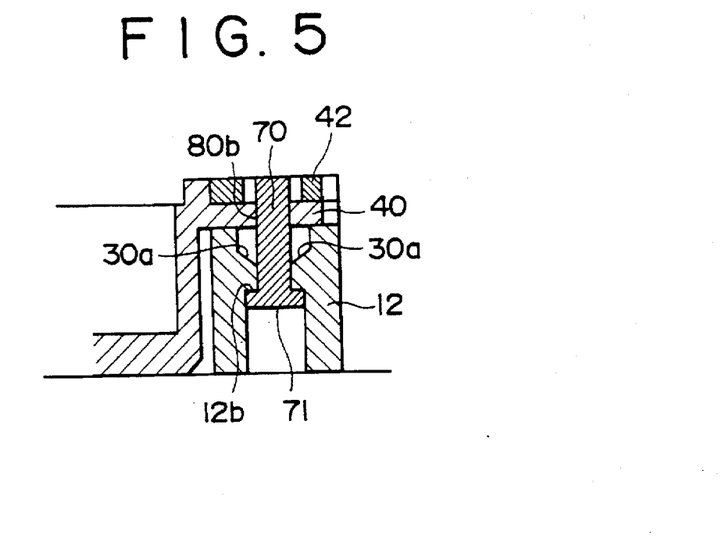
FIG. 5 is a cross-sectional view of FIG. 3 cut along the line B—B.

FIG. 4 is a cross-sectional view along the cut line A—A of FIG. 3, while FIG. 5 is a cross-sectional view along the cut line B—B of FIG. 3.

As shown in FIG. 2 and FIG. 3, the holding member 42 of the optical pickup 10 is provided with the spring portions 60 as a couple of biasing means.

The pressing portions 60a of the spring portions 60 are formed as the free-end portions, while the other end portions 60b are coupled with the holding members 42. The spring portions 60 are formed substantially in the shape of letters V, U or L.

At the center of the holding member 42, only one boss 70 is formed so as to be projected downward for preventing removal of the holding member 42. The boss 70 for preventing removal of the holding member is formed substantially in the shape of an inverted letter T. The lower end portion 71 of the boss 70 is engaged, as shown in FIG. 5, with the lower surface portion 12b of the chassis 12 through the guide surfaces 30a of the V-groove rail 30 of the chassis 12.

Figure 6:
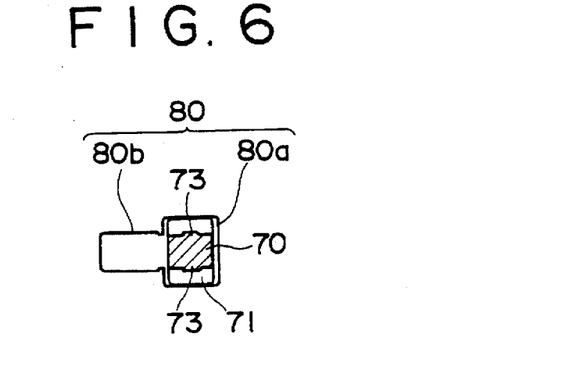
FIG. 6 is a diagram indicating the condition where a boss for preventing removal of the holding member is inserted into a hole of the base member of the optical pickup.
Figure 7:
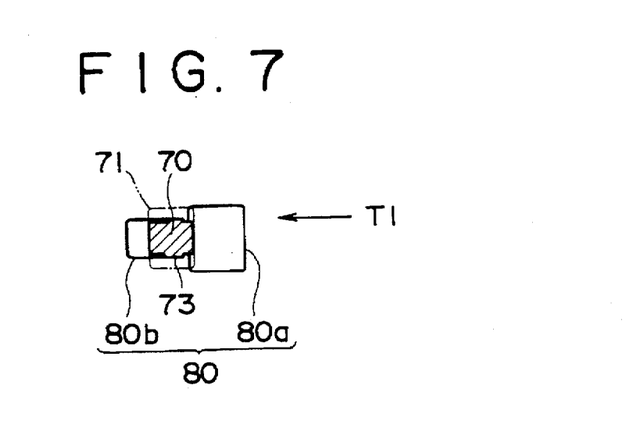
FIG. 7 is a diagram indicating the condition where a boss for preventing removal of the holding member is to be engaged with the narrow part of the hole of the base member from the condition of FIG. 6.
Figure 8:
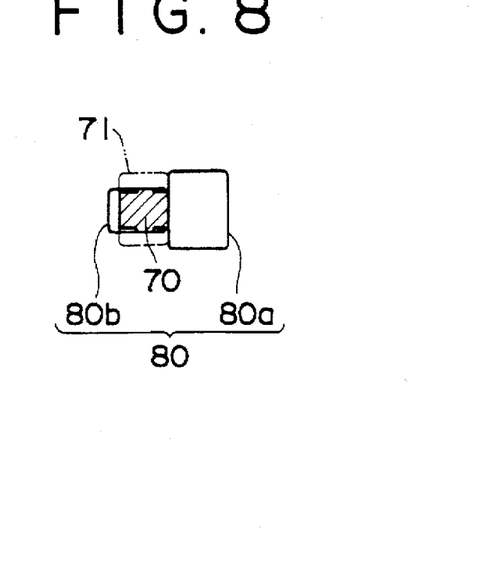
FIG. 8 is a diagram indicating the condition where a boss for preventing removal of the holding member is engaged and fixed in the narrow part of the hole of the base member.

FIG. 6 to FIG. 8 are diagrams seen from the direction indicated by arrow P, illustrating the boss 70 for preventing removal of the holding member 42 and a hole 80 of the base member 40 with which the boss 70 is engaged.

In FIG. 6, the boss 70 is fitted to a larger portion 80a of the hole 80 from the upper side (vertical direction of the drawing). In FIG. 7, the boss 70 is to be fitted to a smaller portion 80b of the hole 80 by sliding the holding member 42 in the direction T1 against the base member 40. Moreover, FIG. 8 illustrates the condition where the boss 70 is fitted to the smaller portion 80b of the hole 80 and fixed therein. That is, a projected portion 73 of the boss 70 is fixed with respect to the smaller portion 80b.

In the position of the boss 70 for preventing removal of the holding member 42 shown in FIG. 8, the spring portions 60, 60 of the holding member 42 are biased, as shown in FIG. 3, near the boss 100 of the base member 40. Namely, the free-end 60a of the spring 60 is pushed toward the ramp portions 90, 90 formed on the base member 40.

The base member 40 is provided, as shown in FIG. 3, with at least two bosses 100 which are formed with inclusion of the arcuated end portions. These bosses 100 are also projected in the same direction as the projecting direction of the spring portions 60. The ramp portion 90 described above is respectively formed near the bosses 100. The bosses 100 are provided for guiding the optical pickup 10 in the radial direction of the disk D along both inclined surfaces 30a of the V-groove rail 30 shown in FIG. 1.

FIG. 5 illustrates the condition where the lower end portion 71 of the boss 70 for preventing removal of the holding member 42 formed in the shape of the inverted letter T explained above is engaged with the lower surface portion 12a of the chassis 12.

However, under this condition, the holding member 42 and the base member 40 are coupled as an integrated unit as explained above because the projected portion 73 of the boss 70 is fitted to the smaller portion 80b of the hole 80 and the base member 40 and the holding member 42 of the optical pickup 10 can be moved as the integrated unit with respect to the chassis 12 along the direction T (direction where the optical pickup 10 moves) of FIG. 2. Namely, the base member 40 is held by the lower end portion 71 of the boss 70 for preventing removal of the holding member 42 and two spring portions 60 of the holding member 42 with respect to the chassis 12 and the base member 40 and the holding member 42 are slid as an integrated unit along the V-groove rail 30.

Next, operations of the spring portions 60 shown in FIG. 3 will be explained.

The free-end portions 60a of the spring portions 60 are pushed to the ramp portions 90 formed as the spring receptors. Since the free-end portions 60 are pushed to the ramp portions 90, the forces generated by the spring portions 60 are respectively distributed in the first direction indicated by the arrow Y and the second direction indicated by the arrow X.

Figure 9A:
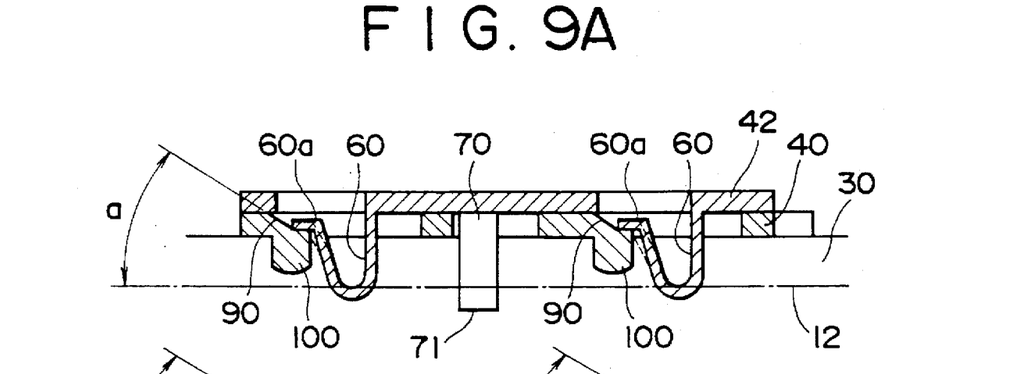
FIG. 9A is a diagram indicating the relationship between a spring portion of the holding member and a ramp area of the base member and FIGS. 9B and 9C are spring force vector diagrams.
Figure 9B:
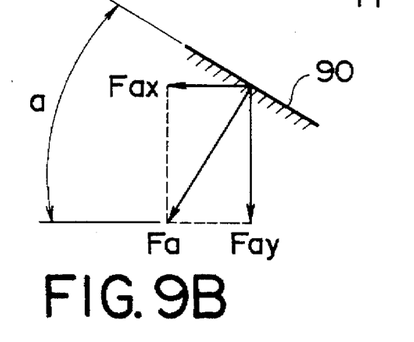
Figure 9C:
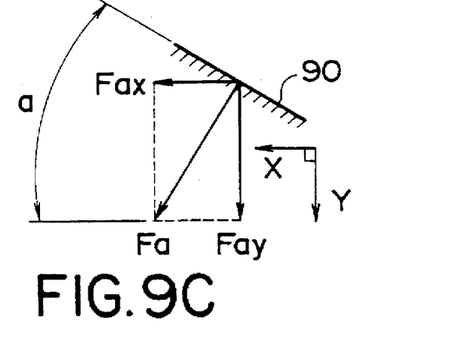

In FIGS. 9A–9C, the force in the first direction indicated by the arrow Y (vertical direction) is defined by Fay, while the force in the second direction indicated by the arrow X (horizontal direction) is defined as Fax. The resultant force of the component of force Fay in the vertical direction and the component of force Fax in the horizontal direction is defined as Fa. In this case, the angle of the ramp portion 90 is indicated as a.

The force Fay in the vertical direction which is a component of force in the first direction pushes the bosses 100, 100 of the base member 40 toward the two inclined surfaces 30a, 30a (refer to FIG. 4) of the V-groove rail 30 of the chassis 12. Moreover, the force Fax in the horizontal direction (direction of the V-groove rail 30) which is a component of force in the second direction works as the force to provide a backlash between the base rack portion (main rack portion) 40 and the idler gear 24 engaged therewith (as the force to stably and smoothly transmit the driving force of the motor to the rack portion).

In FIGS. 9A–9C, moreover, since two spring portions 60 are provided in series, as an example, to the holding member 42, the force Fx working in the horizontal direction (component of force in the second direction) corresponds to the force which is equal to two times the force Fax in the horizontal direction, while the force Fy working in the vertical direction (component of force in the first direction) corresponds to the force which is equal to two times the force Fy in the vertical direction.

As shown in FIGS. 10A–10C and FIGS. 11A–11C, the components of force in the vertical and horizontal directions can be set freely by changing the setting of the angle of the ramp portion 90 formed on the boss 100. That is, the angle a of two ramp portions 90 can be changed freely.

Figures 10A, 10B, 10C:
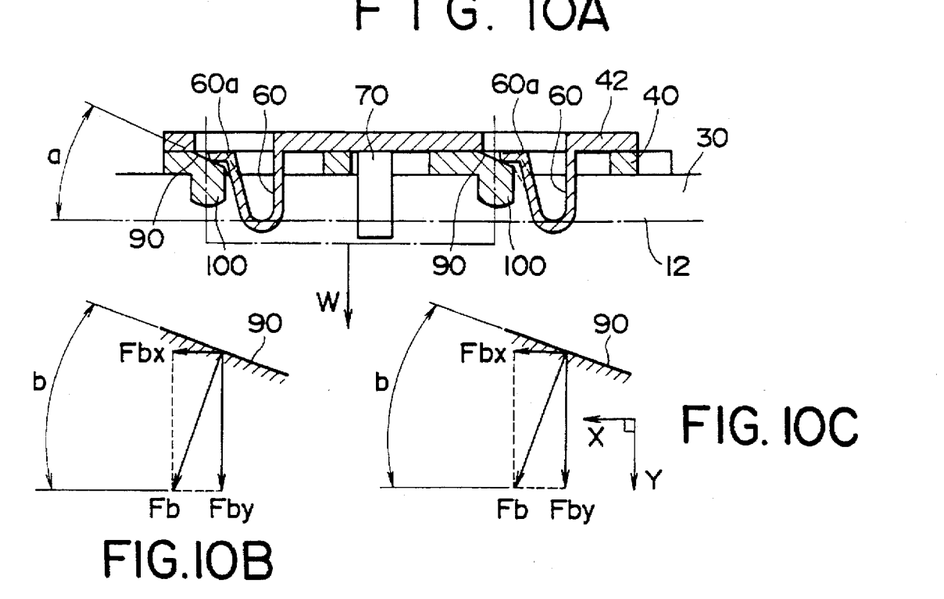
FIG. 10A is a diagram indicating the relationship between a spring portion of the holding member and a ramp area of the base member and FIGS. 10B and 10C are spring force vector diagrams.

For example, as shown in FIGS. 10A–10C, an angle of the ramp portion 90 is defined as b. This angle b is smaller than the angle a of FIG. 9A–9C. In this case, the component of force Fx in the horizontal direction becomes equal to two times the force Fbx and this force 2Fbx can be set smaller than 2Fax of FIGS. 9A–9C. Moreover, the component of force Fy in the vertical direction becomes equal to two times the force Fby and this force 2Fby can be set larger than 2Fay of FIGS. 9A–9C.

Figures 11A, 11B, 11C:
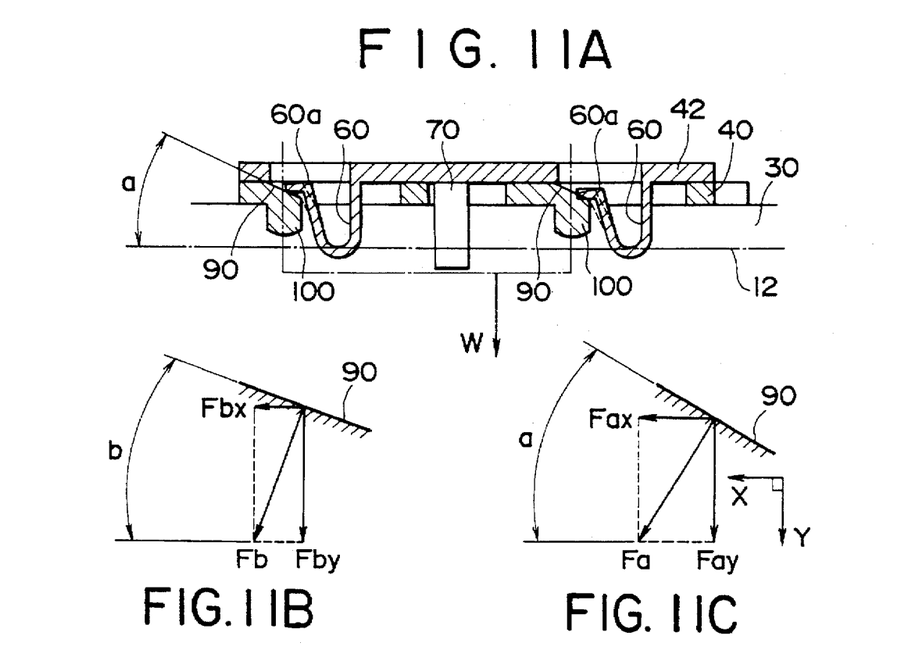
FIG. 11A is a diagram indicating an example of forces in the vertical direction and horizontal direction of the right and left springs when the center of gravity of the optical pickup is found in the right side and FIGS. 11B and 11C are spring force vector diagrams.

In the example shown in FIGS. 11A–11C, the center of gravity W of the optical pickup is found deviated in the right side of the predetermined center of gravity. In this case, the angle of the ramp portion 90 in the right side of FIGS. 11A–11C is defined as a, while the angle of the ramp portion 90 in the left side as b.

Even in this case, the angle b is smaller than the angle a. Thereby, an influence of the moment generated when the center of gravity W of the optical pickup is found deviated in the right side of the predetermined gravity center. That is, deviation of the center of gravity W of the optical pickup can be compensated by freely changing the component of force of the spring portions 60, 60, to realize an adequate setting of the component of force.

The spring portions 60 and the boss 70 for preventing removal of the holding member are formed of plastic together with the holding member 42 as an integral unit. However, the spring portions 60, for example, can naturally be mounted on the holding member 42 using a part composed of a metallic thin plate. Thereby, the pushing force can be increased and reliability can also be improved.

A preferred embodiment of the present invention can eliminate the reference axis and the compressed coil spring or the reference axis and fixing parts which have been required as the essential parts in the prior art. Moreover, the holding member 42, base member 40 and chassis 12 can be assembled from the direction (from only one direction) indicated by the arrow Z of FIG. 2, thereby improving the assembling efficiency.

In addition, a stable holding force or biasing force can be generated and the optical pickup feeding characteristic can be improved by setting the spring force of the spring portion depending on the position of the center of gravity.

As explained above, according to the present invention, the reference axis and compressed coil spring or the reference axis and parts such as fixing parts can be eliminated and moreover assembling efficiency can also be improved.

What is claimed is:

1. A pickup feeding apparatus for feeding, in a radial direction of a disk type recording medium, a pickup to read data recorded on said disk type recording medium, said pickup feeding apparatus comprising:

a drive motor;

a base portion including a through slot having a recessed groove formed thereon on a side of said base portion toward said disk type recording medium, whereby said pickup moves in said radial direction of said disk type recording medium along said recessed groove;

a mounting member, to which said pickup is mounted, including a guide projection slidingly guided along said recessed groove and a rack portion to which a driving force of said drive motor is transmitted;

a holding member including a boss extending through said recessed groove and said slot in said base portion for holding said mounting member movable in said radial direction of said disk type recording medium with respect to said base portion and co-operating with a surface of said base portion adjacent said through slot opposite said side of said base portion and facing away from said disk type recording medium to prevent removal of said mounting member from said base portion; and pressing means arranged on said holding member and extending into said through slot for generating a first force to press said guide projection into said recessed groove of said base portion along a sliding direction and a second force to smoothly transmit said driving force of said drive motor to said rack portion of said mounting member, wherein said pressing means is formed of a spring arm member extending into said through slot and having a first end and a second end and shaped so as to be projected downward away from said disk type recording medium, with said first end of said spring arm member being mounted on said holding member and said second end abutting said guide projection of said mounting member.

2. The pickup feeding apparatus according to claim 1, wherein said second end of said spring arm member is formed as a free-end portion and said mounting member is provided with a biasing surface abutted by said free-end portion to form a biasing unit for biasing said guide projection into said recessed groove.

3. The pickup feeding apparatus according to claim 2, wherein said biasing surface of said mounting member is inclined at a predetermined angle.

4. The pickup feeding apparatus according to claim 3, wherein said biasing surface comprises a first biasing surface and said spring arm member comprises a first spring arm member and said mounting member further comprises a second biasing surface and said pressing means further comprises a second spring arm member having a first end and a second end, each of said first and second biasing surfaces of said mounting member and said first and second spring arm members respectively form first and second biasing units and an angle of said first biasing surface is different from an angle of said second biasing surface depending on a center of gravity position of said pickup.

5. The pickup feeding apparatus according to claim 4, wherein said first and second spring arm members have respective second end portions thereof formed as free-end portions.

6. The pickup feeding apparatus according to claim 5, wherein when said center of gravity position of said pickup is deviated from an intermediate point of said first and second biasing surfaces of said mounting member, a closer one of said first and second biasing surfaces to said center of gravity position has an angle that is set larger than an angle of a farther one of said first and second biasing surfaces.

7. A pickup feeding apparatus for feeding in a radial direction of a disk type recording medium, a pickup to read data recorded on said disk type recording medium, said pickup feeding apparatus comprising:

a drive motor;

a base portion having a recessed groove formed thereon along which said pickup moves in said radial direction of said disk type recording medium;

a mounting member, to which said pickup is mounted, including a guide projection slidingly guided along said groove and a rack portion to which a driving force of said drive motor is transmitted;

a holding member including a boss extending through said recessed groove in said base portion for holding said mounting member movable in said radial direction of said disk type recording medium with respect to said base portion and co-operating with said recessed groove to prevent removal of said mounting member from said base portion; and pressing means arranged on said holding member for generating a first force to press said guide projection toward said groove of said base portion along a sliding direction and a second force to smoothly transmit said driving force of said drive motor to said rack portion of said mounting member, wherein said pressing means is formed of a spring arm member having a first end and a second end in such a shape as to be projected downward and said first end of said spring arm member is mounted on said holding member, said second end of said spring arm member is formed as a free-end portion and said mounting member is provided with a biasing surface to be biased by said free-end portion to form a biasing unit for biasing said guide projection into said recessed groove, and said biasing surface of said mounting member is inclined at a predetermined angle, wherein said boss has a partial projection formed as a holding projection, and a regulating portion for regulating a groove width is provided to a part of said recessed groove of said base portion in said radial direction and said holding projection of said holding member is engaged with said regulating portion of said base portion.

* * * * *